United States Patent [19]

Eldridge

[11] Patent Number: 4,833,686

[45] Date of Patent: May 23, 1989

[54] ELECTRODES FOR TRANSVERSELY EXCITED GAS LASERS

[75] Inventor: Robert E. Eldridge, Los Angeles, Calif.

[73] Assignee: Hughes Aircraft Company, Los Angeles, Calif.

[21] Appl. No.: 66,923

[22] Filed: Jun. 29, 1987

[51] Int. Cl.$^4$ ............................................. H01S 3/097
[52] U.S. Cl. .......................................... 372/87; 372/55
[58] Field of Search ....................... 372/87, 86, 82, 55

[56] References Cited

U.S. PATENT DOCUMENTS

| | | | |
|---|---|---|---|
| 4,523,320 | 6/1985 | Stappaerts | 372/87 |
| 4,554,667 | 11/1985 | Kaminski | 372/87 |
| 4,596,018 | 6/1986 | Gruber et al. | 372/64 |

Primary Examiner—Léon Scott, Jr.
Attorney, Agent, or Firm—W. J. Streeter; A. W. Karambelas

[57] ABSTRACT

An electrode for a transverse gas flow laser has a simplified profile which facilitates the fabrication and subsequent alignment of the electrodes within a laser cavity. Each electrode is essentially comprised of an upper horizontally planar surface having a surrounding radiused edge of a given radius of curvature which is terminated by a surrounding vertical side wall. The termination of the radiused edge by the side wall acts to reduce the total electrode width, resulting in a reduction in required laser package size. A bottom surface of the electrode may be provided with a mounting means, such as a plurality of tapped openings for bolting the electrode to an inner surface of the laser package.

10 Claims, 1 Drawing Sheet

ELECTRODES FOR TRANSVERSELY EXCITED GAS LASERS

FIELD OF THE INVENTION

The present invention relates to transversely excited lasers and, in particular, relates to an electrode for such a laser having a relatively simple cross-sectional profile.

DESCRIPTION OF THE TECHNOLOGY

Transversely excited lasers generally employ two opposed, high aspect ratio electrodes to provide a discharge through a circulating lasant gas medium. Typically, the gas is caused to flow transversely to and between an opposed pair of electrodes, the gas flowing through a region defined by the spacing between the two opposed electrodes. In order to prevent arcing between the electrodes, and a subsequent degradation of the electrode material and the contamination of the gas medium, the inter-electrode spacing and the uniformity of that spacing must be maintained within predetermined limits. The electrode profile, or shape, must also be carefully designed in order to prevent the generation of destructive arcing effects. Previously, complicated and mathematically precise electrode profiles have been employed in order to optimize the discharge and subsequent ionization characteristics within the region between the electrodes. Examples of such profiles are commonly referred to in the art as "Rogowski", "Chang", or "modified Chang" profiles. These electrodes of the prior art have typically been contoured to precisely determined shapes based upon uniform electric field analysis techniques, these analysis techniques using data relating to the magnitude of the discharge voltage and, hence, the current density upon the surface of the electrode, the gas medium pressure, the inter-electrode spacing and other factors. As a result, these prior art types of electrodes all have in common the precise prescription of the electrode surface coordinates. As a consequence of this precise prescription for the electrode profile, the fabrication of such electrodes has required the use of complex and costly digital machining practices or the fabrication of special analog tooling. Also, these electrode profiles of the prior art typically provide electrodes which are much wider than the actual useful discharge region, thus significantly increasing the required dimensions of the overall laser package without providing a corresponding increase in laser output power.

One further disadvantage of these electrodes of the prior art is that due to their complex profile, the requisite alignment of the electrodes one to another within the laser package is difficult and costly to accomplish.

SUMMARY OF THE INVENTION

The aforementioned disadvantages of the electrodes of the prior art have been overcome and other benefits realized by electrodes fabricated in accordance with the teaching of the present invention.

In accordance with the invention, each electrode has a simplified profile which facilitates the fabrication and subsequent alignment of the electrodes within a laser cavity. Each electrode is essentially comprised of an upper horizontally planar surface having a surrounding radiused edge which is terminated by a surrounding vertical edge. The termination of the radiused edge by the vertical edge acts to reduce the total electrode width, resulting in a reduction in required laser package size. A bottom surface of the electrode may be provided with a mounting means, such as a plurality of tapped openings for bolting the electrode to an inner surface of the laser package.

In an illustrative embodiment, an electrode for use with a discharge voltage in the range of 35-40 thousand volts is provided with a rounded edge having a radius of curvature of approximately 7/16 of an inch surrounding the top surface of the electrode. Electrodes having this radius of curvature, in accordance with the teaching of the present invention, have been shown to provide excellent performance characteristics over a wide range of laser operating parameters, the performance characteristics being substantially identical to electrodes of a more complex profile which were fabricated in accordance with the uniform electric field analysis techniques of the prior art.

DETAILED DESCRIPTION OF THE INVENTION

Figure 1:
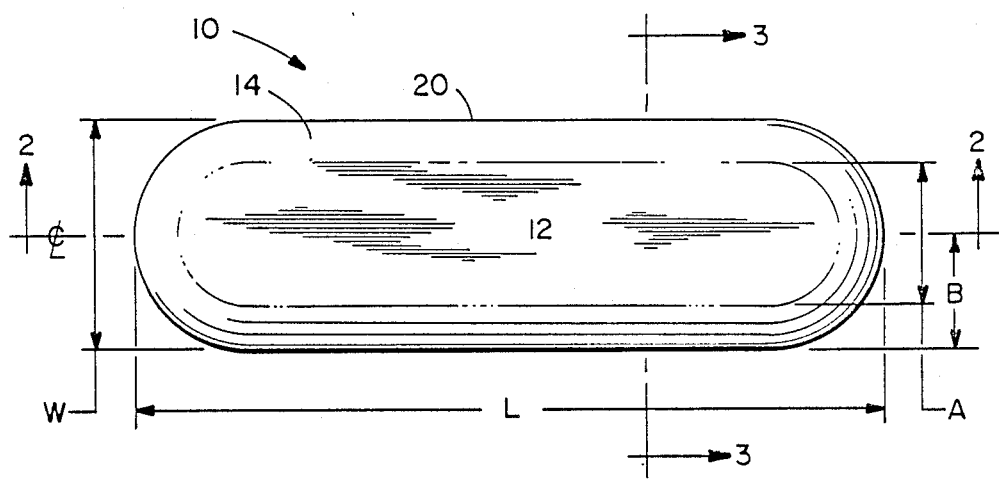
FIG. 1 is a top view of an electrode fabricated in accordance with the present invention.
Figure 2:
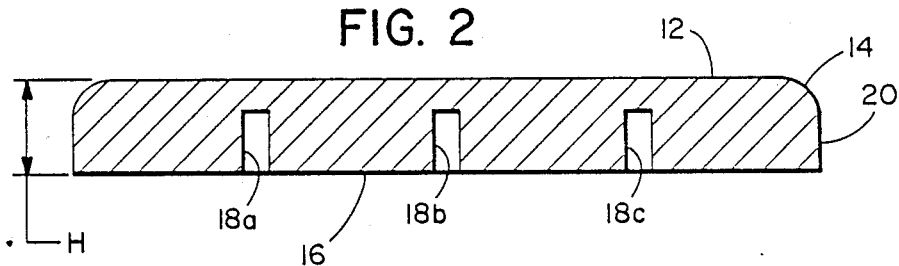
FIG. 2 is a cross-sectional view of the electrode taken along the line 2—2 of FIG. 1.
Figure 3:
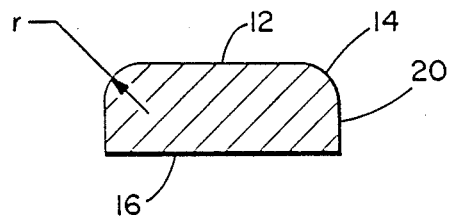
FIG. 3 is a cross-sectional view of the electrode taken along the line 3—3 of FIG. 1.

Referring now to the Figures there is shown an illustrative example of an electrode fabricated in accordance with the present invention.

Electrode 10 can be seen to have a generally elongated shape having a length (L), a width (W), a height (H) and two opposing ends of a generally semicircular contour. Electrode 10 has a horizontally planar, substantially flat upper surface 12, an opposing bottom planar surface 16, and a substantially vertical outer side wall 20. The transition region between the upper flat surface 12 and the vertical side wall 20 is comprised of a convex, rounded edge portion 14 which has a given radius of curvature (r).

As can further be seen, the bottom surface 16 is provided with an electrode mounting means, shown as a plurality of tapped mounting holes 18a, 18b and 18c.

Of course, the number and placement of mounting holes 18 is in large part determined by the mounting requirements for a particular transversely excited laser application and, thus, the number and placement of holes 18 may vary from one embodiment of the invention to another.

Electrode 10 is comprised, typically, of an integral member of a selected metal. The metal selected may be aluminum, stainless steel, copper, or any of a number of other suitable metallic materials. As can be appreciated, the hardness of the selected material is related to the degree of sputtering which may occur in the use of the electrode. For example stainless steel, being a relatively hard material, will exhibit a lesser degree of sputtering than will an electrode comprised of copper. Sputtering, or the dislocation of metal atoms of the surface of the electrode under the influence of excitation energy, may result in undesirable contamination of the circulating lasant gas or of the optical elements within the laser. In order to reduce the amount of sputtering, if a relatively soft metallic material is selected, the material may be coated with a suitable coating to effectively increase the hardness of the outer surface region. One suitable coating material for coating an electrode 10 comprised substantially of copper would be a nickel plating material.

It can be appreciated from the profile of the electrode depicted in the Figures that the profile provides for an electrode which may be relatively easily fabricated.

Such a profile shape lends itself to fabrication by simple milling equipment or even by a simple mold for use with a casting operation. This characteristic of ease of fabrication is especially important when a relatively hard metallic material is chosen for a given application, in that the required amount of machining time for such an electrode is reduced by a significant factor. Thus, relatively high production rates of electrodes may be achieved at a relatively low per electrode unit cost.

In the illustrative embodiment of the present invention, the approximate dimensions of the electrode are as follows:

L=6.00 inches
W=1.30 inches
H=0.40 inches
A=0.60 inches
B=0.65 inches and the transition region 14 has a radius of curvature of approximately 7/16 of an inch.

This radius of curvature has been found to be suitable for producing electrodes for use in a variety of types of transverse gas flow lasers. For example, it has been found that lasers operating at from approximately 0.5 to four atmospheres of gas pressure, from approximately 20 thousand to 40 thousand volts of discharge potential at up to five thousand amperes of current density and at a total electrode input energy of up o six joules may all beneficially employ electrodes having a profile characterized by this radius of curvature of approximately 7/16 of an inch. Furthermore, it has been found that the electrode length and width may be scaled either up or down while retaining this radius of curvature with similar results. It should be noted that if the length and width are scaled that it may be desireable to maintain the height at approximately 0.40 inches inasmuch as the spacing between opposed pairs of electrodes is nominally maintained at one centimeter.

Thus, it can be appreciated that the design of an electrode, in accordance with the teaching of the present invention, does not require the use of rigorous uniform electric field analysis techniques which are required in the design of electrodes of the prior art.

An electrode pair, each of which having dimensions as set forth above, has been found to exhibit performance characteristics in a transversely excited gas laser, operated at 35–40 KV discharge voltage, which are substantially identical to electrodes having the more complex profile shapes of the prior art. In addition, such an electrode pair is more readily aligned within the laser cavity and furthermore, is more readily fabricated than are those electrodes of the prior art. In addition, an electrode fabricated in accordance with the illustrative embodiment can be seen to have a narrow width due to the substantially vertical side wall 20. Thus, instead of the sides of the electrode having a curvature which extends from the top surface completely to the bottom surface, the vertical side wall provides for a reduction in electrode width and a corresponding reduction in the overall size of the required laser package. This curvature of the edge 14 prevents the occurrence of undesirable arcing between opposed electrodes while yet providing for the beneficial reduced electrode width.

Of course, the specific embodiment set forth above is illustrative only, and is not to be construed to limit the use of the invention to the dimensions disclosed herein. Also, it will be readily apparent to those skilled in the art that modifications and variations can be made therein without departing from the spirit and scope of the present invention. Accordingly, it is not intended that the present invention be limited to or by the specific embodiment set forth above, the invention is to be instead limited only as defined by the appended claims.

What is claimed is:

1. An electrode for a transverse gas flow laser comprising:
    an elongated member having a substantially flat top surface and a substantially flat bottom surface, said top and said bottom surfaces being disposed substantially parallel one to another, said member further having opposing ends of substantially semicircular shape, said member further having a substantially vertical side wall extending perpendicularly upwards from said bottom surface and surrounding said member, said side wall and said top surface being joined by a convex transition region having a given, substantially constant radius of curvature, the substantially constant radius of curvature enabling said electrode to be used use over a range of at least approximately 5,000 volts of discharge potential.

2. An electrode as defined in claim 1 wherein said given radius of curvature is approximately 7/16 of an inch.

3. An electrode as defined in claim 1 wherein said bottom surface is provided with a mounting means for mounting said electrode to an inner surface of a laser cavity.

4. An electrode as defined in claim 1 wherein said member is comprised of aluminum, stainless steel or nickel coated copper.

5. An electrode for a transverse gas flow laser comprising:
    an integral member having an elongated shape with rounded ends, said member having a surrounding vertical side wall and a top surface and a bottom surface disposed substantially parallel one to another, said bottom surface being perpendicularly disposed to said side wall, said member further having a rounded edge about said top surface joining said top surface to said side wall, said rounded edge having a substantially constant radius of curvature, the substantially constant radius of curvature enabling said electrode to be used over a range of at least approximately 5,000 volts of discharge potential.

6. An electrode as defined in claim 5 wherein said rounded edge has a radius of curvature of approximately 7/16 of an inch.

7. An electrode as defined in claim 6 further comprising means for securing said electrode to a surface of a laser cavity.

8. An electrode as defined in claim 7 wherein said securing means are a plurality of tapped holes made within said bottom surface.

9. An electrode for a transverse gas flow laser comprising:
    an elongated metallic member having a planar top surface and a planar bottom surface disposed substantially parallel one to another, said member further having a convex surface having an upper portion joined to and surrounding said top surface, said convex surface extending downwards from said upper portion towards said bottom surface, said convex surface being terminated at a lower portion thereof by a substantially vertical side surface which extends upward from said bottom surface to said lower portion of said convex surface, and wherein said convex surface has a substantially constant radius of curvature of approximately 7/16th of an inch, the substantially constant radius of curvature enabling said electrode to be used use over a range of at least approximately 5,000 volts of discharge potential.

10. An electrode as defined in claim 9 wherein said member has a thickness between said top and said bottom surfaces of approximately 0.4 inches.

* * * * *